UNITED STATES PATENT OFFICE.

M. D. DU BOIS, OF NEWBURG, NEW YORK.

ROOFING-CEMENT.

Specification forming part of Letters Patent No. 25,324, dated September 6, 1859.

*To all whom it may concern:*

Be it known that I, M. D. DU BOIS, of Newburg, in the county of Orange and State of New York, have invented a new and useful composition of matter, the same being a Cement for Roofing Purposes; and I do hereby declare that the following is a full, clear, and exact description of the ingredients of the same, together with the mode of compounding them.

The object of the within-described invention is to obtain a roofing-cement that will not soften under the rays of the sun, at least not in an appreciable degree, and at the same time one that will not harden and crack at a low temperature—difficulties that have not, so far as I am aware, been hitherto entirely overcome.

My composition is composed of the following ingredients: eighteen gallons coal-tar, two gallons india-rubber solution, one gallon gum-shellac varnish, two and one-half gallons asphaltum solution, two gallons linseed-oil; total, twenty-five and one-half gallons. The india-rubber is dissolved in turpentine, the gum-shellac is dissolved in alcohol, and the asphaltum is dissolved in turpentine to form the solutions above specified. The following dry mixture is also used: twelve pounds soapstone dust, four pounds litharge, four pounds French ocher, four pounds sugar of lead, two pounds zinc paint, dry, (oxide of zinc;) total, twenty-six pounds. The above ingredients are compounded as follows: I take six pounds of asphaltum and dissolve it under a moderate heat in two gallons of purified spirits of turpentine. I then remove the asphaltum solution from the kettle and put into the latter two gallons of raw linseed-oil, and, while boiling hard, add the two gallons of india-rubber solution and stir well. I then add the four pounds of litharge, and when the whole is somewhat cool the eighteen gallons coal-tar, four pounds French ocher, two pounds zinc paint, (oxide of zinc,) twelve pounds soapstone-dust, two and one-half gallons of asphaltum solution, one gallon gum-shellac varnish, and four pounds sugar of lead are added.

The soapstone-dust, litharge, French ocher, sugar of lead, and oxide of zinc give a body and drying quality to the composition, while the coal-tar, india-rubber, shellac, and asphaltum are water-proof substances rendered fluid by the solutions and oil, and prevent the dry substances from becoming hard and from cracking, the latter at the same time preventing the former from becoming soft and fluid by the heat of the sun.

The composition is applied as follows: The roof to receive the composition is covered with canvas or any suitable cloth, and the composition is then spread over the canvas by means of a brush. Fine sand is then thrown over the composition, and when dry a succeeding coat of the composition may be applied and sanded, as many coats being employed as circumstances may require.

My composition may be applied to leaky tin roofs equally as well as to new roofs covered with canvas or cloth. In the former case the composition may be applied directly to the tin-plate; no canvas being required. The latter is necessary in new roofs to cover the boards, in order that the latter may not absorb the oil and fluid portions of the composition before they have an opportunity to dry.

I am aware that many of the within-described ingredients have been used for roofing and similar purposes, and I do not claim, in combination, any number of the ingredients herein specified less than the whole compounded as described.

I claim, therefore, as new and desire to secure by Letters Patent—

A composition formed of the ingredients or substances compounded in the proportions and in the manner as herein specified, for the purpose set forth.

M. D. DU BOIS.

Witnesses:
 GEO. M. LESLIE,
 WM. CARTWRIGHT.